(12) United States Patent
Heirich

(10) Patent No.: US 6,814,613 B1
(45) Date of Patent: Nov. 9, 2004

(54) CONNECTOR REVEAL

(75) Inventor: Douglas L. Heirich, Palo Alto, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/476,406

(22) Filed: Dec. 30, 1999

(51) Int. Cl.[7] ............................................. H01R 13/73
(52) U.S. Cl. .......................... 439/552; 174/66; 220/3.8
(58) Field of Search ................................. 439/544, 531, 439/550, 552, 557, 562; 174/66; 220/241, 3.8; 200/295, 296

(56) References Cited

U.S. PATENT DOCUMENTS

| | | | | |
|---|---|---|---|---|
| 3,636,236 A | * | 1/1972 | Smith | 174/66 |
| 3,816,679 A | * | 6/1974 | Hotchkiss | 174/66 X |
| 3,902,625 A | * | 9/1975 | Schmidhuber | 220/3.8 X |
| 4,334,630 A | * | 6/1982 | Bergin | 220/3.8 X |
| 6,064,005 A | * | 5/2000 | Raasch | 174/66 |

* cited by examiner

*Primary Examiner*—Gary Paumen
(74) *Attorney, Agent, or Firm*—Henneman & Saunders; Larry E. Henneman, Jr.

(57) ABSTRACT

A case (12) for a computer monitor (10) having a tub (16) with a case aperture (38) therein adapted for receiving a subpanel (26). The subpanel (26) has a plurality of electrical connectors (28) which are user accessible thereby. A beveled flange (40) on the subpanel (26) is received within a receiving flange (44) on the case aperture (38). A structural grid (32) within the case (12) has a flexible portion (34) which includes a can (33) coupled to a flexible arm (35), and which has a screw receiving aperture (42) therein such that a screw (30) is passed through a subpanel screw aperture (48) in the subpanel (26) and secured within the screw receiving aperture (42), thereby flexing the flexible portion (34) to hold the subpanel (26) firmly within the case aperture (38).

20 Claims, 7 Drawing Sheets

CONNECTOR REVEAL

TECHNICAL FIELD

The present invention relates to the field of mechanical construction, and more particularly to an improved connector reveal for an electronic component case. The predominant current usage of the present inventive improved connector reveal is in the construction of a computer monitor case, wherein it is desirable to have a means to quickly and inexpensively affix a case subpart to the case.

BACKGROUND ART

In the construction of electronic component devices, such as computers, computer monitors, and the like, it is frequently required to have electrical connectors which are accessible from the outside of the case. It is known in tho art to attach such connectors to a body subpanel, sometimes a recessed body panel, such that such body panel can be constructed as a separate subcomponent which is affixed to the case during the final assembly thereof. In the prior art, it has frequently been difficult to align such subpanel to the rest of the case such that the subpanel aligns nicely with the surrounding case. A poorly aligned subpanel has often been the result.

In an effort to better cosmetically align such case subpanels in an aperture in the case provided therefore, it has been the practice to try to more precisely manufacture the parts such that they fit together with greater precision. However, such precision manufacturing can be quite expensive and, indeed, there are limits to how precisely and reliably plastic parts can be manufactured. Therefore, while significant expense has been incurred in an effort to solve this problem, a reliable and inexpensive solution has thus far evaded practitioners in the field.

While it would be desirable to have an inexpensive and reliable method and/or apparatus for affixing a body subpanel, or the like, within an aperture provided therefore such that such subpanel is nicely aligned and centered within the aperture, no such method and/or apparatus has existed in the prior art.

DISCLOSURE OF INVENTION

Accordingly, it is an object of the present invention to provide a method and apparatus for easily and inexpensively affixing a case subpanel within an aperture in the case.

It is another object of the present invention to provide a method and apparatus which will result in a subpanel being consistently centered in an aperture provided therefor.

It is yet another object of the present invention to provide a computer component housing having a reveal which is nicely aligned in relation to a surrounding panel.

It is still another object of the present invention to provide a computer component housing which is inexpensive to produce, both in time and material.

It is yet another object of the present invention to provide a component housing subpart which is easily affixed to the remainder of the component housing.

It is still another object of the present invention to provide a component housing subpart which is rugged in construction.

Briefly, an embodiment of the present invention is a computer monitor having a case made up of several component parts. One of such parts, a "tub" in this present example, has an aperture therein provided for accepting a subpanel. The subpanel is adapted for containing a plurality of electrical connectors such that the electrical connectors can be accessed from outside the housing by an end user. A structural grid within the housing has a flexible portion with a grid screw aperture therein, the screw aperture is adapted for accepting a self tapping screw which is passed through a subpanel screw aperture in the subpanel and screwed into the grid screw aperture such that the flexible portion of the grid is caused to flex toward the subpanel, thereby holding the subpanel in place by spring tension. The subpanel has a beveled outer lip for preventing the subpanel from being drawn within the tub, and further for providing a self centering effect within the aperture provided in the tub.

An advantage of the present invention is that a housing subpanel is quickly and easily affixed to a component housing.

A further advantage of the present invention is that a housing subpanel is inexpensive to manufacture.

Yet another advantage of the present invention is that a housing subpanel and associated housing need not be constructed to extremely tight tolerances.

Still another advantage of the present invention is that the subpanel reveal is well aligned within an aperture provided therefor.

Yet another advantage of the present invention is that the subpanel reveal is well secured within the aperture provided therefor.

These and other objects and advantages of the present invention will become clear to those skilled in the art in view of the description of modes of carrying out the invention, and the industrial applicability thereof, as described herein and as illustrated in the several figures of the drawing. The objects and advantages listed are not an exhaustive list of all possible advantages of the invention. Moreover, it will be possible to practice the invention even where one or more of the intended objects and/or advantages might be absent or not required in the application

BEST MODE FOR CARRYING OUT INVENTION

Figure 1:
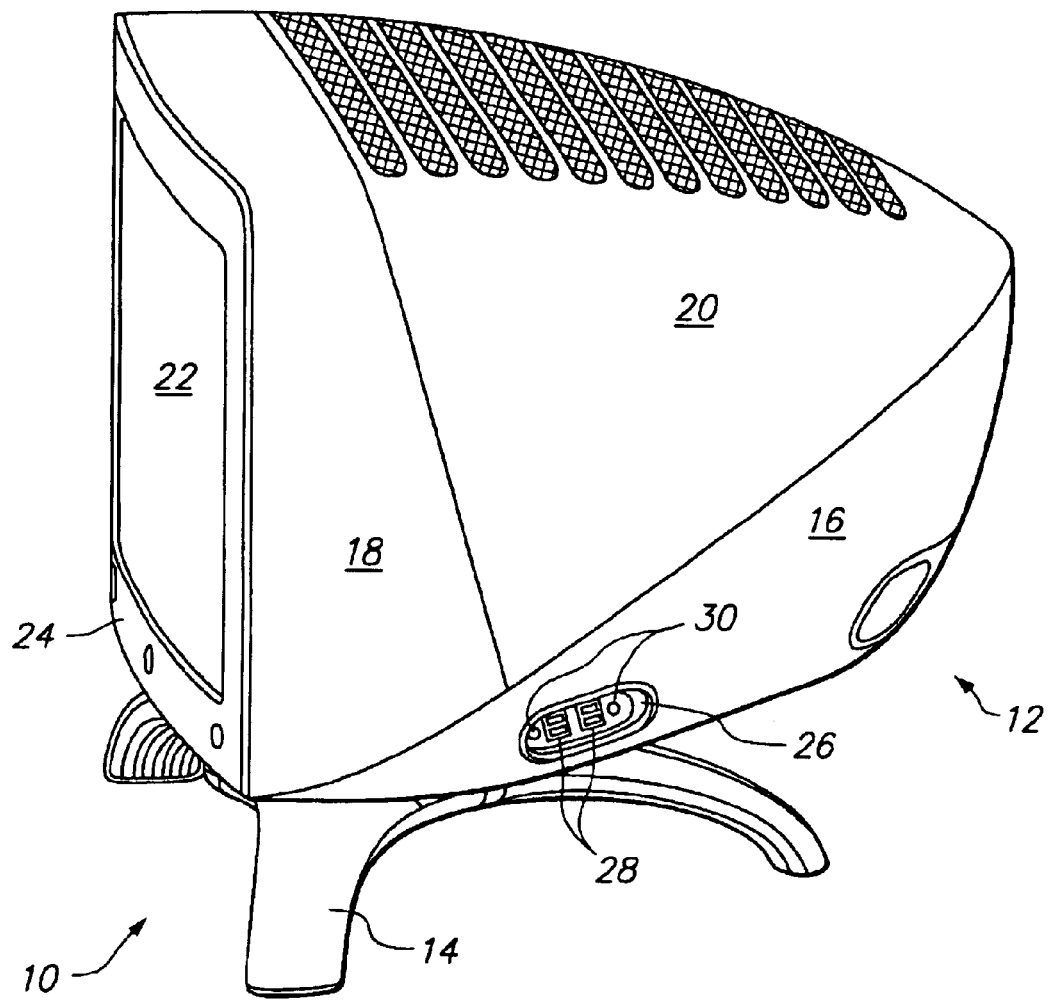
FIG. 1 is perspective view of a computer monitor constructed according to the present invention.

The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

A known mode for carrying out the invention is a computer monitor constructed according to the present inventive method. The inventive computer monitor is depicted in a perspective view in FIG. 1 and in a side elevational view in FIG. 2, and is designated therein by the general reference character 10. The computer monitor 10 has a case 12 constructed from component parts including a base 14, a tub 16, a case front 18, a case cover 20, a screen 22 and a bezel 24 generally surrounding the screen 22. In this example, the screen 22 is the front portion of a cathode ray display tube (concealed within the case 12 in the view of FIG. 1, although it is within the scope of the invention that essentially any type of display screen could be used for the purpose. The cathode ray tube (except the screen 22 portion thereof) and other electronic components of the monitor 10 are not unique to the present invention, and will be omitted from the drawing in order to more succinctly present the present invention. In the view of FIG. 1 can be seen a case subpanel 26 affixed to the tub 16. The subpanel 26 is adapted for accepting a plurality (two in this present example) of electrical connectors 28 which, in this present example, are universal serial bus ("USB") connectors. The electrical connectors 28 are accessible to an end user on the outside of the case 12. Also in the view of FIG. 1 can be seen screws 30, whereby the subpanel is affixed to the case 12, as will be discussed in more detail hereinafter.

Figure 2:
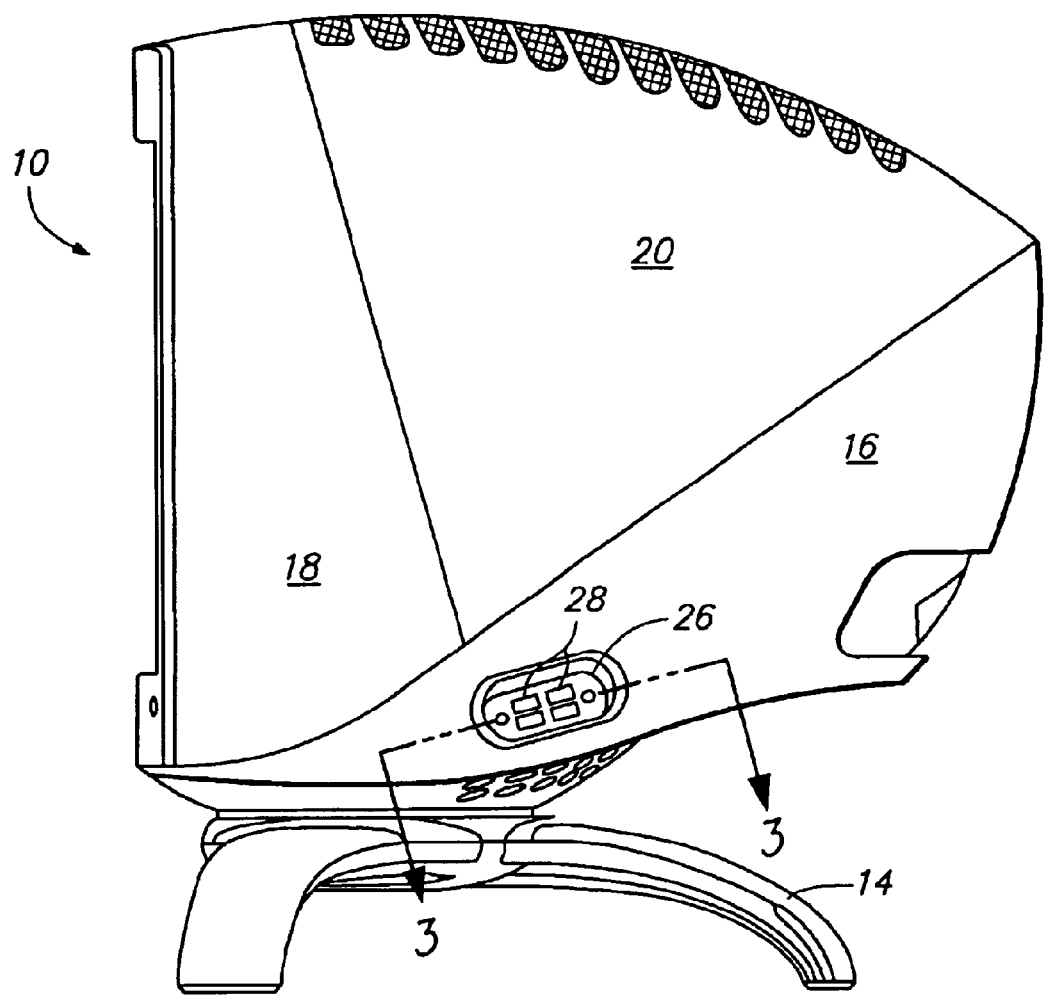
FIG. 2 is a side elevational view of the computer monitor of FIG. 1.
Figure 3:
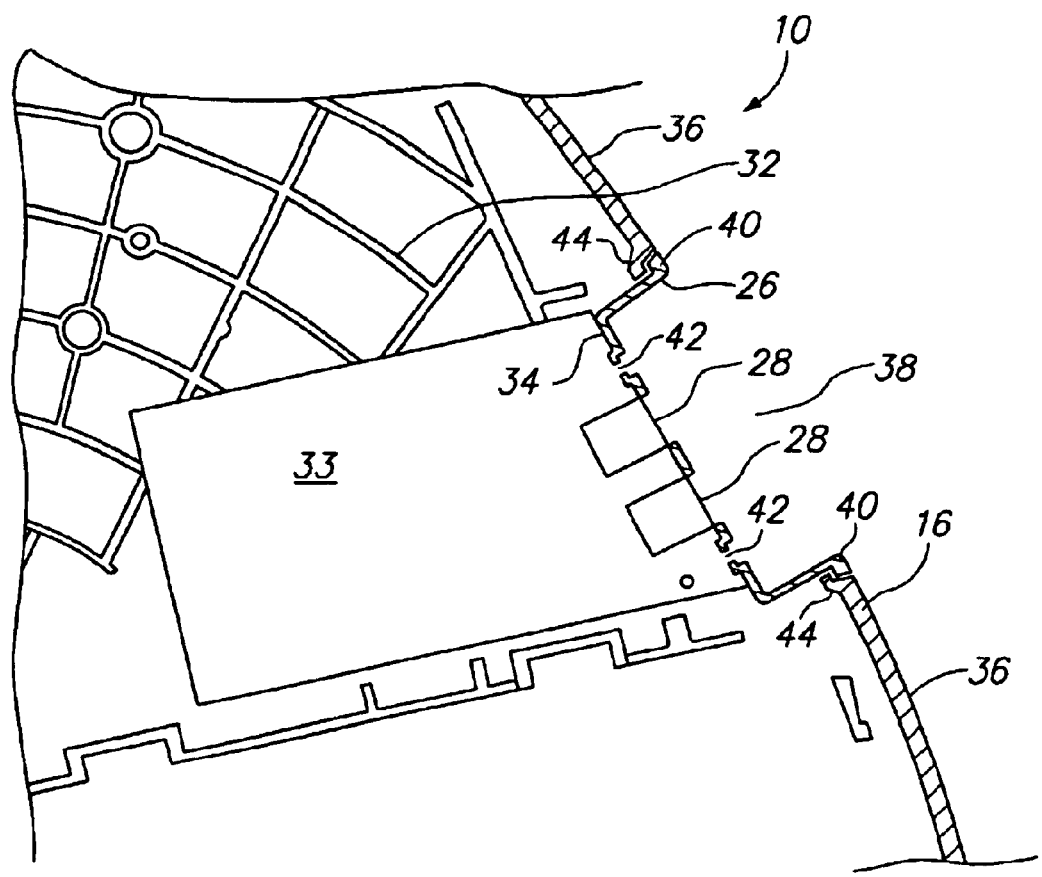
FIG. 3 is a cross sectional top plan view of a portion of the computer monitor of FIG. 2, taken along line 3—3 of FIG. 2.

FIG. 3 is a cross sectional view of a portion of the monitor 10, taken along line 3—3 of FIG. 2. In the view of FIG. 3 can be seen a structural grid 32 within the tub 16. The structural grid 32 has a flexible portion 34 whereto the subpanel 26 is affixed. In the particular embodiment shown in FIG. 3, flexible portion 34 includes an electronics enclosure 33 flexibly coupled (connection obscured from view in FIG. 3 by electronics enclosure 33) to structural grid 32. In the view of FIG. 3, it can be seen that the subpanel 26 is shaped such that the electrical connectors 28 (FIG. 1) are recessed in relation to an outer surface 36 of the tub 16. As will be discussed in greater detail, hereinafter, the flexible portion 34 acts as a spring apparatus to hold the subpanel 26 securely in place.

Figure 4A:
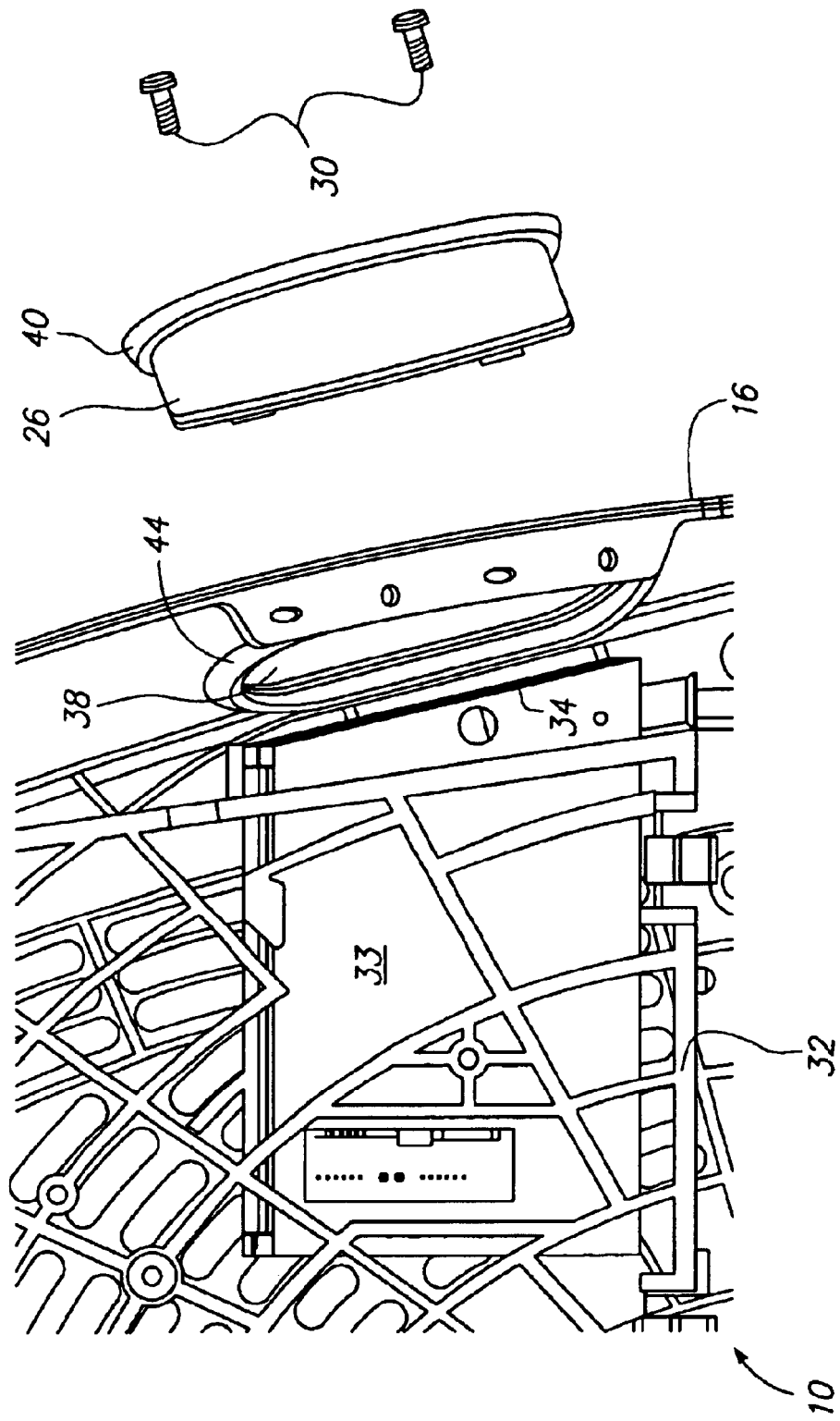
FIG. 4A is an exploded top view of a portion of the computer monitor of FIGS. 1 and 2.
Figure 4B:
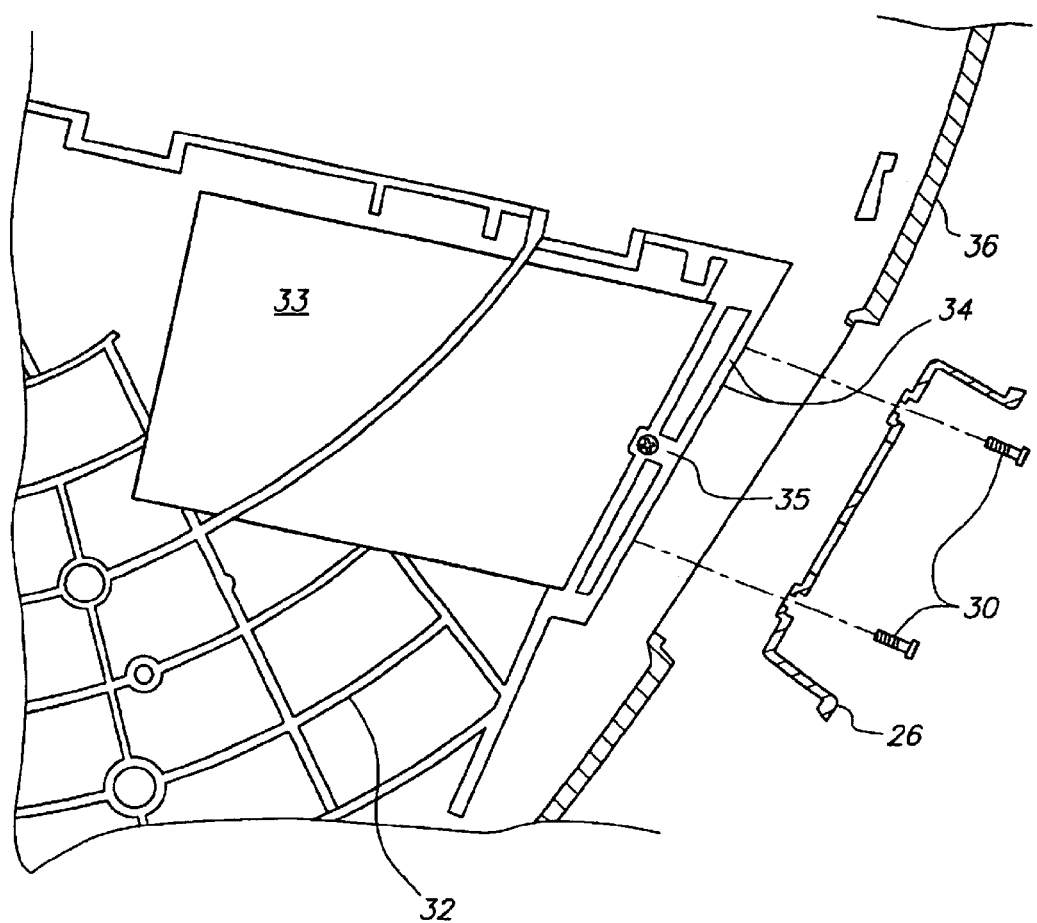
FIG. 4B is an exploded bottom view of the portion of the computer monitor of FIG. 4A.

FIG. 4A is a partially exploded view of the monitor 10, similar to the view of FIG. 3, showing a relevant part thereof. In the view of FIG. 4A the subpanel 26 is shown detached from the flexible portion 34 of the structural grid 32, and the screws 30 whereby the subpanel 26 is to be attached to the flexible portion 34 can be seen. Flexible portion 34 includes a flexible piece 35 (FIGS. 4B and 5B) of grid 32 (obstructed from view in FIG. 4A by the electronics enclosure 33), which is generally straight when the subpanel 26 is not attached thereto (FIG. 4B) and is flexed into a somewhat curved shape (FIG. 5B) when the screws 30 are drawn tight to affix the subpanel 26 to the flexible portion 34, thereby pulling enclosure 33 in a direction indicated by the directional arrow in FIG. 5B. In the view of FIG. 4A can be seen a case aperture 38 in the tub 16, wherein the subpanel 26 is to be received. A beveled flange 40 around the outer edge of the subpanel 26 is shaped generally like the case aperture 38, but is slightly larger in its outside dimensions than the inside dimensions of the case aperture 38. This prevents the subpanel 26 from being drawn entirely within the tub 16 when the screw 30 is tightened to the flexible portion 34 of the structural grid 32.

In the view of FIG. 3 can be seen two screw receiving apertures 42 adapted for receiving the screws 30 of FIG. 4A. In this example of the invention, the screws 30 are self tapping screws and the screw receiving apertures 42 are merely holes drilled in the electronics enclosure 33 of flexible portion 34 such that the screws 30 will hold tightly in the screw receiving apertures 42. In the view of FIG. 3, it can be seen that, in this example of the invention, the case aperture 38 in the tub 16 has an optional beveled receiving flange for mating with the beveled flange of the subpanel 26, such that the subpanel 26 will tend to be centered within the case aperture 38 when the subpanel 26 is drawn snugly within the case aperture 38 by tightening the screws 30 into the screw receiving apertures 42 of the electronics enclosure 33 of the flexible portion 34.

Figure 5A:
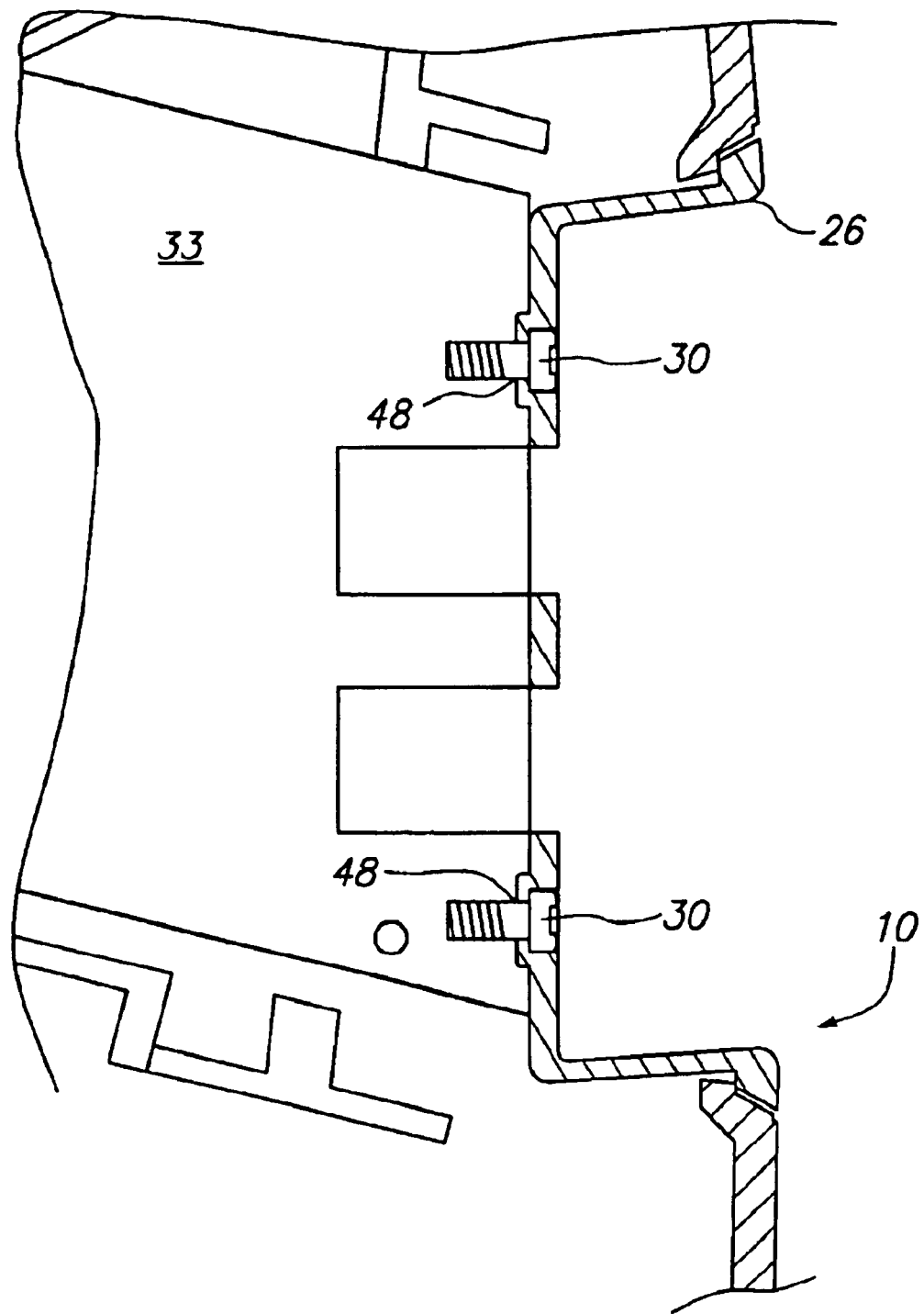
FIG. 5A is a downward cross sectional view of a subpanel, according to the present invention.
Figure 5B:
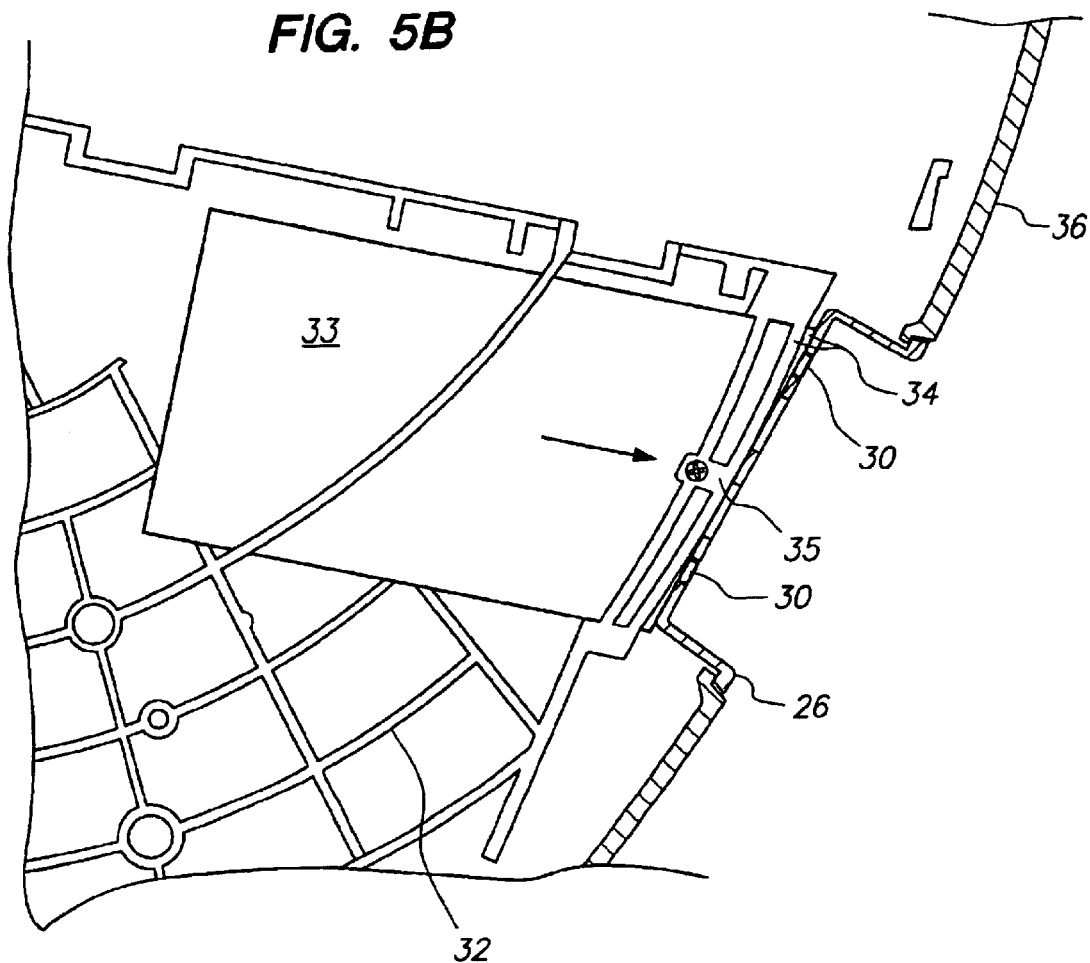
FIG. 5B is an upward cross sectional view of the subpanel of FIG. 5A.
Figure 6:
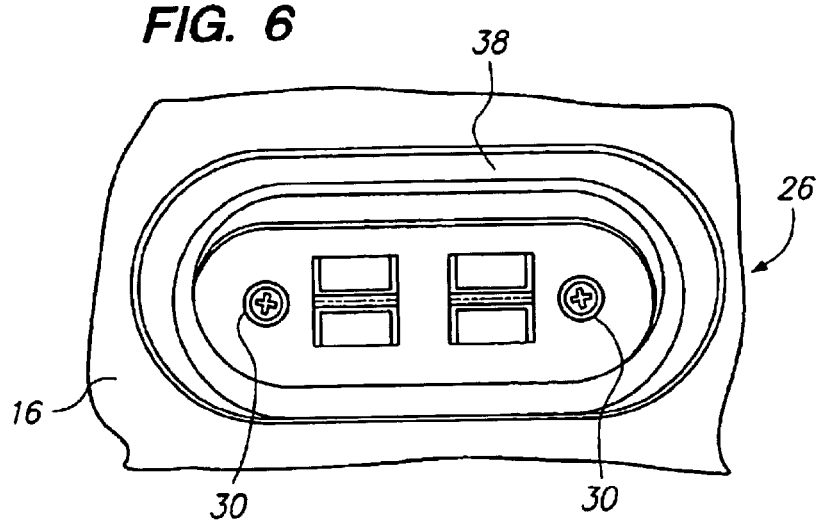
FIG. 6 is an elevational view of the subpanel of FIGS. 5A and 5B within the case of the computer monitor of FIGS. 1 through 4B.

FIG. 5A is a cross sectional view of the subpanel 28 of this presently described embodiment of the invention. In the view of FIG. 5A can be seen subpanel screw apertures 48 wherethrough the screws 30 are passed to secure the subpanel 26 to the screw receiving apertures 42 FIG. 3). within the case aperture 38 when the screws 30 are tightened to secure the subpanel 26 within the case aperture 38.

Various modifications may be made to the invention without altering its value or scope. For example, since only one flanged surface is necessary to center the subpanel 26 within the case aperture 38, the inventive case 12 could be reconfigured to eliminate either the receiving flange 44 or the beveled flange 40 of the subpanel 26. Another likely modification would be to provide some alternative structure to provide spring tension to pull the subpanel 26 firmly into the case aperture 38.

All of the above are only some of the examples of available embodiments of the present invention. Those skilled in the art will readily observe that numerous other modifications and alterations may be made without departing from the spirit and scope of the invention. Accordingly, the disclosure herein is not intended as limiting and the appended claims are to be interpreted as encompassing the entire scope of the invention.

Industrial Applicability

The inventive subpanel 26, and related structures as described by way of example herein, are intended to be widely used in the construction of housings and cases for electronic equipment, including computer monitors, computers, computer printers, and the like. While the example of the invention, as described herein, is presented as a computer monitor case, this application is not considered to be a restriction on the scope of the application of the invention.

Since the improved case 12 of the present invention may be readily produced and integrated with existing designs for computer monitors and other electronic devices, and since the advantages as described herein are provided, it is expected that it will be readily accepted in the industry. For these and other reasons, it is expected that the utility and industrial applicability of the invention will be both significant in scope and long-lasting in duration.

I claim:

1. An improved housing, comprising:

an electronic component chassis;

a case portion having a subpanel aperture therein;

a subpanel adapted for fitting generally into the subpanel aperture; and a spring apparatus, coupled to the chassis, for pulling the subpanel into the subpanel aperture when the subpanel is affixed to the spring apparatus.

2. The improved housing of claim 1, wherein:

the spring apparatus includes a flexible plastic piece.

3. The improved housing of claim 1, wherein:

the spring apparatus includes a flexible plastic portion of the chassis.

4. The improved housing of claim 1, wherein:

the subpanel has a beveled flange such that the subpanel is generally centered within the subpanel aperture when the subpanel is pulled into the subpanel aperture.

5. The improved housing of claim 1, wherein:

the subpanel aperture has a beveled edge such that the subpanel is generally centered within the subpanel aperture when the subpanel is pulled into the subpanel aperture.

6. The improved housing of claim 1, wherein:

the subpanel is adapted for receiving an electrical connector.

7. The improved housing of claim 1, wherein:

the subpanel defines an opening such that the electrical connector is user accessible from the outside of the housing when the subpanel is affixed within the subpanel aperture.

8. The improved housing of claim 1, wherein:

the housing is a computer monitor case.

9. An improved housing, comprising:

a structural grid;

a case portion at least partially surrounding the structural grid and having a subpanel aperture therein; and a subpanel adapted for fitting generally into the subpanel aperture; wherein the subpanel has a beveled lip such that the subpanel is generally centered within the subpanel aperture when the subpanel is drawn fully into the subpanel aperture by engaging the structural grid.

10. The improved housing of claim 9, wherein the subpanel engages the structural grid via a spring apparatus.

11. The improved housing of claim 10, wherein:

the spring apparatus includes a flexible portion which is caused to flex toward an outer surface of the housing when the subpanel is secured to the flexible portion.

12. The improved housing of claim 11, wherein:

the flexible portion includes a flexible member of the structural grid.

13. The improved housing of claim 10, wherein:

the subpanel is secured to the spring apparatus by a screw passed through a subpanel screw aperture and screwed into a spring apparatus screw receiving aperture.

14. The improved housing of claim 9, and further including:

a beveled edge on the subpanel aperture such that the subpanel is generally centered within the subpanel aperture when the subpanel is drawn into the subpanel aperture.

15. A computer monitor, comprising:

a screen;

a case;

a subpanel aperture in the case;

a subpanel adapted to fit within the subpanel aperture; and a structural grid having a flexible portion adapted to pull the subpanel into the subpanel aperture.

16. The computer monitor of claim 15, wherein:

the subpanel has a beveled lip such that the subpanel is centered within the subpanel aperture when the subpanel is pulled into the subpanel aperture.

17. The computer monitor of claim 15, wherein:

the subpanel aperture has a beveled interior edge such that the subpanel is centered within the subpanel aperture when the subpanel is pulled into the subpanel aperture.

18. The computer monitor of claim 15, wherein:

the flexible portion comprises a flexible member of the structural grid.

19. The computer monitor of claim 15, wherein:

the subpanel is secured to the flexible portion by a screw.

20. The computer monitor of claim 15, wherein:

the subpanel is adapted for holding an electrical connector such that the electrical connector is user accessible from the outside of the computer monitor.

* * * * *